United States Patent [19]

Reffert et al.

[11] Patent Number: 4,460,764

[45] Date of Patent: Jul. 17, 1984

[54] REMOVAL OF THE CATALYST FROM POLYPHENYLENE ETHERS

[75] Inventors: Rudi W. Reffert, Beindersheim; Juergen Hambrecht, Heidelberg; Adolf Echte; Hans H. Schuster, both of Ludwigshafen; Hermann Dreher, Seeheim-Jugenheim, all of Fed. Rep. of Germany

[73] Assignee: BASF Aktiengesellschaft, Fed. Rep. of Germany

[21] Appl. No.: 516,383

[22] Filed: Jul. 21, 1983

[30] Foreign Application Priority Data

Jul. 24, 1982 [DE] Fed. Rep. of Germany ....... 3227745

[51] Int. Cl.$^3$ .............................................. C08G 65/44
[52] U.S. Cl. .................................... 528/487; 528/212; 528/482; 528/486; 528/488; 528/492; 528/494; 528/495; 528/496; 528/499
[58] Field of Search ............... 528/212, 482, 486, 487, 528/488, 492, 494, 495, 496, 499

[56] References Cited

U.S. PATENT DOCUMENTS

| | | | |
|---|---|---|---|
| 3,838,102 | 9/1974 | Bennett et al. | 528/499 |
| 3,951,917 | 4/1976 | Floryan et al. | 260/47 ET |
| 3,984,374 | 10/1976 | Cooper et al. | 528/212 |
| 3,994,859 | 11/1976 | Floryan et al. | 528/212 |
| 4,070,383 | 1/1978 | Rutledge | 528/212 |
| 4,097,458 | 6/1978 | Bennett et al. | 260/47 ET |
| 4,237,265 | 12/1980 | Eliassen et al. | 528/499 |
| 4,263,426 | 4/1981 | Cooper et al. | 528/499 |

FOREIGN PATENT DOCUMENTS 1329174 4/1971 United Kingdom .

*Primary Examiner*—Lester L. Lee
*Attorney, Agent, or Firm*—Keil & Weinkauf

[57] ABSTRACT

In the preparation of a high molecular weight polyphenylene ether from a monohydric phenol by an oxidative coupling reaction with oxygen in the presence of a catalyst complex obtained from a metal salt and an organic amine and in the presence of a solvent, and isolation of the metal ion component of the catalyst from the polyphenylene ether solution by means of a complex-forming or chelate-forming compound, the catalyst is removed by a method wherein complex formation and isolation of the metal ion component of the catalyst are carried out in an aqueous medium in the presence of from 0.1 to 5,000 mg of an anionic or nonionic surfactant.

6 Claims, No Drawings

REMOVAL OF THE CATALYST FROM POLYPHENYLENE ETHERS

The present invention relates to a method of removing the catalyst in the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 15° to 50° C. in the presence of a catalyst complex obtained from a metal salt and an organic amine and in the presence of from 1 to 20 parts by weight of a solvent per part by weight of the monomeric phenol, and in the presence or absence of an activator, and isolation of the metal ion component of the catalyst from the polyphenylene ether solution by means of a complex-forming or chelate-forming compound.

Polyphenylene ethers and processes for their preparation are well known and have been described in many publications, for example U.S. Pat. Nos. 3,306,874, 3,306,875, 3,639,656, 3,642,699 and 3,661,848.

The processes most frequently used for the preparation of polyphenylene ethers comprise autocondensation of monohydric phenols in the presence of oxygen and of a catalyst.

Preferred catalysts are metal-amine complexes, in particular Cu-amine complexes, and preferred solvents are aromatic hydrocarbons. The reaction is usually terminated by removing the catalyst from the reaction mixture. This is done by using an aqueous solution of an inorganic or organic acid, as carried out, for example, by the counter-current extraction method in British Patent No. 1,329,174. Other compounds used are polycarboxylic acids and/or polyaminocarboxylic acids (cf. U.S. Pat. No. 3,838,102) or other chelating agents, eg. nitrilotriacetic acid and its sodium salts or ethylenediaminetetraacetic acid and its sodium salts ($Na_3$-EDTA) (cf. U.S. Pat. No. 3,951,917), the latter also in combination with quaternary ammonium salts (cf. U.S. Pat. No. 4,062,870). Isolation of the catalyst with the aid of complex-forming agents from the group comprising the bisguanides has also been described (cf. U.S. Pat. No. 4,097,458). In addition to terminating the oxidative autocondensation, the addition of the complex-forming agent is aimed at achieving very substantially complete removal of the metal catalyst from the polyphenylene ether, since contamination of the polymer by residual metal has an adverse effect on the entire spectrum of properties of the polymer. The sensitivity to oxidation and the inherent color are particularly affected.

However, all conventional measures for removing the residual catalyst have the disadvantage that repeated extraction steps, entailing complicated separation processes in some cases, have to be used in order to achieve complete removal (residual amounts of metal ions less than 10 ppm). Frequently, these procedures change the character of the polyphenylene ether.

It is an object of the present invention to provide a simple and highly effective method of isolating the residual catalyst from the reaction products formed in the autocondensation of monohydric phenols.

We have found that this object is achieved by carrying out the complex formation and the isolation of the metal ion component of the catalyst in an aqueous medium in the presence of from 0.1 to 5,000 mg of an anionic or non-ionic surfactant per kg of the organic solution of the polyphenylene ether.

For the purposes of the present invention, a high-molecular weight polyphenylene ether is a chain of alkyl-substituted benzene rings linked in the para-position via an oxygen atom, the chain being formed by oxidative coupling of 2,6-dialkylphenol. The novel polymers have number average molecular weights ($M_n$) of from 10,000 to 90,000, preferably from 20,000 to 80,000, determined by the method described in Macromolecular Synthesis 1 (1978), 83. High molecular weight polyphenylene ethers, also referred to as poly(phenylene oxides), have long been known (cf. for example U.S. Pat. Nos. 3,661,848, 3,219,625 and 3,378,505) and therefore do not require further description here.

The monohydric phenols which are alkyl-substituted in the two ortho-positions but not in the para-position and may or may not be alkyl-substituted in the meta-position, and which are used for the preparation of high molecular weight polyphenylene ethers are conventional phenols, such as 2,6-dimethylphenol, 2,6-diethylphenol, 2-methyl-6-ethylphenol, 2-methyl-6-propylphenol, 2,6-dibutylphenol and 2,3,6-trimethylphenol, as well as mixtures of these.

To carry out the polycondensation, oxygen is usually passed into the solution of the monomers, at 25°–50° C., in the presence of a catalyst complex. The oxygen throughput is essentially the same as described in U.S. Pat. Nos. 3,306,874 and 3,306,875. The catalyst, comprising a copper salt, preferably copper(I) bromide, an amine and from 0.01 to 5% by weight of 2,6-dimethylphenol, is metered into the initially taken solution of the monomers by a conventional procedure.

The catalyst complex conventionally used for the polycondensation is usually a combination of an amine, eg. n-dibutylamine, diethylamine, picoline, quinoline, a pyridine base, triisopropylamine, dimethylisopropanolamine, triethanolamine, triisopropanolamine or diisopropanolamine, with a copper salt, eg. copper(I) bromide, copper(I) chloride, copper(I) iodide, copper(II) acetate, copper(II) propionate, copper(II) acetoacetate or copper(II) acetylacetonate. The amine is preferably used in an amount of from 2.0 to 25 moles per 100 moles of the monomer, but its concentration in the reaction mixture can vary within wide limits; low concentrations are, however, advantageous. The concentration of the copper salt is kept low, and is from 0.2 to 2.5 moles per 100 moles of the monomer.

The solvent is usually employed in an amount of from 1 to 20 parts by weight per part by weight of the monomer, ie. as high as a 20-fold excess of solvent.

Suitable solvents are benzene, toluene, ethylbenzene and aliphatic hydrocarbons, in particular $C_6$–$C_{10}$-hydrocarbons.

The reaction mixture may also contain an activator, such as a diarylguanidine or a diarylformamidine (cf. U.S. Pat. No. 3,544,515).

The polycondensation reaction is carried out by passing oxygen into a solution of the monomer at from 15° to 50° C., in particular from 15° to 40° C., in the presence of the amine complex. The reaction is complete after a short time, ie. the catalyst mixture is metered into the monomer solution in the course of from 0.1 to 1.5 hours, while gassing the solution with oxygen or air.

When the desired yield has been achieved in the polycondensation, and the polymer has obtained the desired molecular weight, the reaction solution contains from 1 to 30% by weight of polyphenylene ether, from 0.005 to 1.5% by weight of metal ions and about 0.1–6.0% by weight of amine, and may contain small amounts of other materials.

In accordance with the invention, this reaction solution is treated with a metal complex-forming compound in the presence of a surfactant in order to isolate the metal catalyst present in the polymer solution.

The complexing agents used are aqueous solutions of inorganic or organic acids, as described in, for example, British Patent No. 1,329,174, as well as polycarboxylic acids and/or polyaminocarboxylic acids (cf. U.S. Pat. No. 3,838,102) or other chelating agents, such as nitrilotriacetic acid and its sodium salts or ethylenediaminetetraacetic acid and its sodium salts ($Na_3$-EDTA) (cf. U.S. Pat. No. 3,951,917), the latter also in combination with quaternary ammonium salts (U.S. Pat. No. 4,026,870), such as complex-forming agents from the group comprising the bisguanides (cf. U.S. Pat. No. 4,097,458) and other complex-forming compounds.

The complex-forming agent is preferably present in an amount of from 0.5 to 5 moles per mole of metal ion in the catalyst.

Preferably used surfactants are non-ionic compounds, eg. block polymers of alkylene oxides, ethylenediamine polyalkylene glycols and polyalkylene glycol ethers of alcohols, phenols and fatty acids, and mixtures of the polyglycol compounds.

They are preferably used in an amount of from 0.1 to 100 mg per kg of the solution of the polyphenylene ether.

The present invention does not relate to the manner in which the anionic or non-ionic surfactant is added. It may be advantageous to meter it in the form of from 0.1 to 15% strength solutions, and, depending on its solubility, the solvent used may be water or mixtures of water with water-miscible organic solvents, eg. alcohols and their mixtures with aromatic solvents, or organic solvents or mixtures of these.

Mixing the surfactant into the polyphenylene ether solution to be treated is advantageously carried out before the aqueous solution of the metal-complexing agent is used. This method of addition constitutes the optimum procedure where the surfactant employed is only partially soluble or insoluble in water or is soluble only in organic solvents. However, it is also possible for the surfactant to be introduced into the polyphenylene ether solution simultaneously with (or after the addition of) the aqueous solution of the complexing agent, or to be dissolved in the solution of the complexing agent. The surfactant can be added at once or a little at a time, either continuously or batchwise, with or without additional amounts of water or solvents, at from 20° to 90° C. The time of contact of the surfactant with the polyphenylene ether solution can be from 1 minute to several hours if the surfactant is employed before the solution of the complexing agent. Otherwise, the contact time of the complexing agent is essentially the determining factor, although this can be substantially shortened as a result of the special mode of action of the surfactants.

The surfactants are used in an amount of from 0.1 to 5,000, preferably from 0.1 to 100, mg per kg of the solution of the polyphenylene ether.

The addition of the complexing agent to the catalyst-containing polyphenylene ether solution, too, is carried out by a simple procedure. For example, the compounds can be added in the form of their alkali metal, ammonium and/or amine salts, in aqueous solution, in combination, according to the invention, with the surfactant. Addition can be effected at once or a little at a time, either continuously or batchwise, together with additional water. The metal compound can be isolated in a suitable apparatus, eg. a decantation tank, a liquid/liquid centrifuge or another phase-separation apparatus.

When the complex-forming agent is present in the novel combination with the surfactant, the contact time of this agent with the catalyst-containing polyphenylene ether phase can vary within wide limits. It is preferably from 1 minute to 5 hours, and from 5 to 60 minutes are often adequate. The temperature is preferably from 20° to 90° C., but may be below or above this range.

According to the invention, preferred anionic surfactants are alkali metal or ammonium salts of carboxylates, sulfonated and sulfate-containing carboxylates, carboxylic acid esters, carboxamides, alkylsulfonates, arylsulfonates, alkylsulfates, arylether-sulfates, amidoether-sulfates, succinates, sarcosides, alkylsulfates, sulfosuccinates, ether-sulfonates, thiosulfates, alkyl phosphates, glycerol phosphates, phosphites, phosphonates and phosphinates.

According to the invention, preferred non-ionic surfactants are polyglycol ethers, polyglycol esters, polyglycol amides, aryl polyglycol ethers, polypropyleneglycol ethers, polypropyleneglycol esters, polypropyleneglycol amides, polyalcohols, polyamines, glycosides, high molecular weight ethylene oxide-containing and/or propylene oxide-containing adducts, eg. block copolymers of alkylene oxides, ethylenediamine polyalkylene glycols and mixtures of non-ionic surfactants.

The surfactants, in particular the non-ionic ones, can contain minor amounts of anticorrosion agents, eg. fatty acid amides.

A detailed list of anionic and non-ionic surfactants is given in Tensid-Taschenbuch, Carl Hanser Verlag, München, Wien, Editor: Dr. H. Stache (2nd edition 1981, pages 5–10).

Complete removal of the metal catalyst from the polyphenylene ether polymer can be achieved by repeated addition of the novel combination of surfactant and complex-forming compound followed by isolation of the resulting metal complex by the methods described above. In a preferred embodiment of the invention, however, the entire amount of catalyst is removed from the polymer in one complexing and separation step.

In order further to reduce the residual metal content in the polyphenylene ether solution, it may be advantageous in individual cases to remove the water remaining in the mixture by distillation under reduced pressure, atmospheric pressure or superatmospheric pressure, after the complexing step and with or without mechanically separating off the metal complex-containing aqueous phase beforehand. Any constituents, in particular compounds of the metal ion of the catalyst, which separate out of the polymer solution during this procedure can then be removed from the polymer solution by a conventional method of liquid/solid separation, eg. filtration, centrifuging, etc.

After the metallic component has been removed as a complex, the polyphenylene ether can be isolated from the solution by the methods described in the U.S. patents mentioned at the outset. The isolation of the polyphenylene ether is not critical for the present invention. For example, the polyphenylene ether can be isolated from a reaction solution by precipitation by means of a solution-inhibitor, for example an excess of an alcohol, such as methanol. The filtered product can be suspended in the alcohol and, if desired, stirred with a decolorizing agent. The polyphenylene ether is then filtered off, and converted to films, fibers, shaped articles, etc. by a conventional process. Other alcohols, eg. isopropanol, propanol or ethanol, may also be used.

The amine component of the catalyst can be recovered by distillation or by another conventional method.

The particular advantages achieved using the invention are that the combination of a surfactant with a complexing agent permits a substantial reduction in the residual amount of metal catalyst in the polyphenylene ethers, the resulting polyphenylene ethers possess improved color stability and stability to oxidation during processing at above 250° C., isolation of the metal catalysts by the novel process is simple and is generally carried out in one step, and polyphenylene oxide reaction solutions having low as well as relatively high concentrations (not more than 25% by weight) can be converted without problems. A further advantage is that the combination of the complexing agent with the surfactant causes the complexing reaction to proceed rapidly and permits a decisive and very rapid quantitative isolation of the metal complex-containing aqueous phase without troublesome emulsion formation.

As mentioned above, a preferred aspect of the present invention is the preparation of polyphenylene ether solutions which have a low metal content and from which the polymeric substances can be obtained by a total isolation method, eg. spray-drying, steam precipitation or hot-water crumbling. This facilitates the economical use of such processes; in respect of energy required, solvent losses, etc., they are more economical than the conventional precipitation processes.

The Examples which follow illustrate the invention, although there is no intention to restrict it. Parts are by weight unless stated otherwise.

The intrinsic viscosity is measured on a 0.5% strength by weight solution in chloroform at 30° C.

EXAMPLES

Preparation of poly(2,6-dimethyl-1,4-phenylene) ether:

In a vessel, 1,3 g of Cu(I) bromide, 20 g of 1,4-dimethylpentylamine and 2 g of 2,6-dimethylphenol (DMP) were stirred for 5 minutes at 20° C. while 30 liters/hour of oxygen were continuously passed in. The mixture was metered into a solution of 204 g of DMP in 1,400 ml of toluene in the course of 30 minutes, stirring was continued for 1 further hour at 20° C. and the oxygen stream was then discontinued.

Isolation of the metal ion from the reaction mixture containing the polyphenylene ether: At the end of the reaction, the toluene reaction solution contained a polyphenylene ether and 0.53 g/kg of Cu. To this solution was added in succession, while stirring vigorously, 100 mg of a surfactant in the form of a 2% strength solution and an amount of the complex-forming compound corresponding to 1.1 times the molar amount of copper present in the reaction mixture, and an amount of water such that all samples contained 50 g of water per kg of reaction solution.

The mixture of the reaction solution with the complex-forming compound, or with the surfactant and the complex-forming compound, was kept at 75° C. for 45 minutes, while stirring vigorously. 15 minutes were allowed for material to settle out, after which the aqueous and oily phases were separated from one another in a separating funnel. The Cu concentration measured in each of the oily phases is shown by way of comparison in the Table.

TABLE

| No. | Surfactant | Complex former | [Cu] mg/kg |
|---|---|---|---|
| 0 | — | — | 530 |
| 1 | — | Na$_2$—EDTA[1] | 33 |
| 2 | Surfactant I | Na$_2$—EDTA | 1 |
| 3 | — | Na—NTRA[2] | 40 |
| 4 | Surfactant I | Na—NTRA | 1 |
| 5 | Surfactant II | Na$_2$—EDTA | 1 |
| 6 | Surfactant III | Na$_2$—EDTA | 1 |

[1] Disodium ethylenediaminetetraacetate
[2] Monosodium nitrilotriacetate

The surfactants used are as follows:
Surfactant I: a high molecular weight water-soluble alkylene oxide block copolymer.
Surfactant II: a high molecular weight toluene-soluble oxyalkylation product of adipic acid.
Surfactant III: a mixture of high molecular weight water-soluble oxyalkylation products of an alkylphenol-formaldehyde resin and a polyamine.

We claim:

1. A method of removing the catalyst in the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 15° to 50° C. in the presence of a catalyst complex obtained from a metal salt and an organic amine, and in the presence of from 1 to 20 parts by weight of a solvent per part by weight of the monomeric phenol, and in the presence or absence of an activator, and isolation of the metal ion component of the catalyst from the polyphenylene ether solution by means of a complex-forming or chelate-forming compound, wherein complex formation and isolation of the metal ion component of the catalyst is carried out in an aqueous medium in the presence of from 0.1 to 5,000 mg of a surfactant which must be anionic or non-ionic per kg of the organic solution of the polyphenylene ether.

2. The method of claim 1, wherein the surfactant is an anionic surfactant selected from the group consisting of alkali metal or ammonium salts of carboxylates, sulfonated and sulfate-containing carboxylates, carboxylic acid esters, carboxamides, alkylsulfonates, arylsulfonates, alkylsulfates, arylether-sulfates, amidoethersulfates, succinates, sarcosides, alkylsulfates, sulfosuccinates, ether-sulfonates, thiosulfates, alkyl phosphates, glycerol phosphates, phosphites, phosphonates and phosphinates.

3. The method of claim 1, wherein the surfactant is a non-ionic surfactant selected from the group consisting of polyglycol ethers, polyglycol esters, polyglycol amides, aryl polyglycol ethers, polypropyleneglycol ethers, polypropyleneglycol esters, polypropyleneglycol amides, polyalcohols, polyamines, glycosides, high molecular weight ethylene oxide-containing and/or propylene oxide-containing adducts thereof.

4. The method of claim 1, wherein the amount of surfactant used in the process is from 0.1 to 100 mg per kg of the solution of the polyphenylene ether.

5. The method of claim 2, wherein the amount of surfactant used in the process is from 0.1 to 100 mg per kg of the solution of the polyphenylene ether.

6. The method of claim 3, wherein the amount of surfactant used in the process is from 0.1 to 100 mg per kg of the solution of the polyphenylene ether.

* * * * *